May 17, 1960 C. ARTANDI ET AL 2,937,279
STERILIZATION INDICATOR
Filed Oct. 25, 1957 2 Sheets-Sheet 1

INVENTORS
CHARLES ARTANDI
ALBERT ADAM STONEHILL
BY Leonard P. Prusak
ATTORNEY

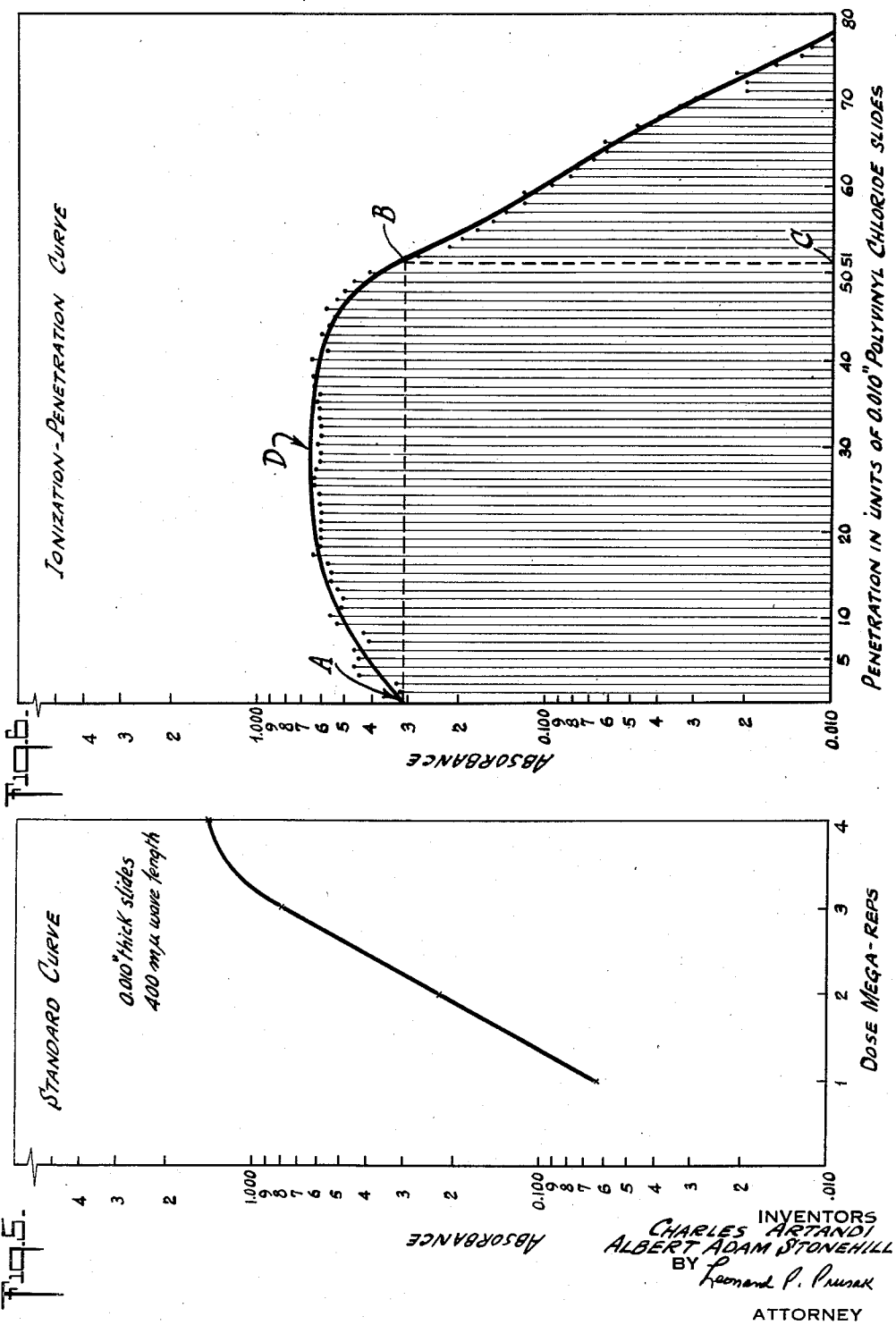

United States Patent Office 2,937,279
Patented May 17, 1960

2,937,279

STERILIZATION INDICATOR

Charles Artandi, Highland Park, and Albert Adam Stonehill, Plainfield, N.J., assignors to Ethicon, Inc., a corporation of New Jersey Application October 25, 1957, Serial No. 692,360

11 Claims. (Cl. 250—83)

This invention relates to an indicator for sterilization by high energy irradiation. More particularly, the present invention is concerned with a polyvinyl chloride dosimeter and to a method for indicating the degree of high energy exposure by means of such dosimeter.

The rapid development of high energy instrumentation and the increased availability of knowledge regarding irradiation techniques such as safety limits, penetrating ability of rays and the effects of irradiation on living as well as inert matter, have resulted in widespread application of this phenomenon throughout numerous industrial and experimental fields. For example, irradiation now finds application in the prevention of food spoilage, in the preservation of tissue and organ specimens for future examination and in the impediment of malignant growths in man.

One of the more recent developments in the field of high energy irradiation on the industrial level is the use of high-voltage electrostatic generators such as the Van de Graaff and the linear accelerator as a means for sterilizing drugs, surgical supplies and consumer goods. In fact, there is considerable evidence available that sterilization by electron beam irradiation may relegate steam under pressure to an outmoded and antiquated status. This is not an unexpected development, inasmuch as steam sterilization is a cumbersome, time-consuming and tedious procedure. Moreover, it has the added disadvantage of being limited in applicability on the industrial level. Illustrative of the former is the fact that steam under pressure cannot be employed in the sterilization of goods borne in packages made of synthetic plastic materials since these substances are subject to decomposition and deterioration at high temperatures. Thus, electron-beam irradiation lends itself admirably well to the sterilization of a wide variety of substances and materials since the obstacle of sensitivity to elevated temperatures is not present.

Among the many difficulties which have been encountered during the development of electron-beam sterilization processes has been the problem of providing adequate safeguards to ensure complete sterility of the materials subjected to irradiation, and numerous techniques have been devised with this purpose in mind. One of the earliest methods employed in the field of irradiation dosimetry was the use of chemicals such as ferrous-ferric sulfates and cerous-ceric sulfates which, in solution, undergo reduction-oxidation changes upon irradiation. The extent of the irradiation is reflected in the amount of oxidized ions present in the solution, this being determined by titration. Unfortunately, chemical dosimeters such as these are extremely cumbersome, time-consuming, and unsuitable for the determination of high-dose irradiation. Dyes have also been used as indicators in irradiation sterilization but they have the disadvantage of being difficult to see with the naked eye when the irradiation dose is of a low order. Furthermorse, since it is difficult to get a uniform dispersion of dye, there is danger that different shades of color may be obtained with a given dye for the same irradiation dose. Glass has been tried as an irradiation indicator, but it is unsatisfactory since the color imparted to it upon irradiation fades gradually, the fading process being accelerated by exposure to light or higher temperatures. The use of photographic film (X-ray) is also undesirable because it is too sensitive, turning black upon exposure to merely a few hundred REP's (Roentgen equivalent physical). There is, therefore, an acute need for an irradiation indicator which is reliable and susceptible to a wide range of applications, particularly those of an industrial nature.

We have now discovered that rigid polyvinyl chloride may be employed as an indicator and dosimeter in irradiation sterilization where the amount of high energy emitted is at least 1 mega REP. This substance is peculiarly suited as a visual aid in ascertaining the presence or absence of exposure to irradiation. Also, and more importantly, it is a reliable and accurate tool for determining the REP dose which a given irradiated material has received.

In order that the nature of the invention and the description hereinbelow may be more readily understood, reference will be made to the accompanying illustrative drawing forming a part hereof in which:

Fig. 5 represents a standard curve for dosimetry with rigid polyvinyl chloride film.

Fig. 6 represents an ionization-penetration curve for a linear accelerator.

Figure 1:
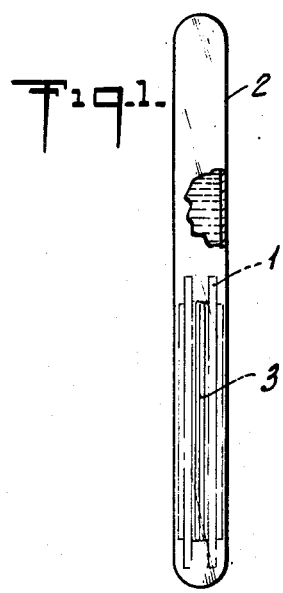
Fig. 1 represents a plan view of a hermetically sealed glass container and showing a suture wound on a reel.

As an irradiation indicator, rigid polyvinyl chloride is an extremely versatile material and its advantages over the various types of indicators heretofore empolyed are numerous. Firstly, rigid polyvinyl chloride is capable of absorbing electron beam energy over a wide range of mega REP's while at the same time retaining a high degree of sensitivity and accuracy. Secondly, rigid polyvinyl chloride develops color quickly upon irradiation. Once developed, the color is stable over an indefinite period of time, and will not vary with ambient temperature or alternate exposure to light and darkness. Thirdly, because of its peculiar sensitivity, rigid polyvinyl chloride can be used not only as an indicator in the visual range, but also as an accurate dosimeter. That is to say, rigid polyvinyl chloride can be reliably employed to determine the exact dose of irradiation which a given material has received. This is an important consideration for it frequently happens that, as a result of unknown mechanical failure, materials passing under an electron beam (or being otherwise subjected to high energy) do not absorb all of the energy intended or perhaps absorb an excessive amount of energy. By employing rigid polyvinyl chloride, it is readily possible to keep a constant check on the accuracy of an irradiation operation. In fact, where units of packaged materials are being successively passed under the electron beam, the use of rigid polyvinyl chloride enables the determination of REP dose for each package without in any way endangering the sterility of such package.

Color development in rigid polyvinyl chloride takes place within a period of about four days after exposure to irradiation. However, if so desired, the development of color may be accelerated by raising the temperature of the exposed indicator to about 120° F. By so doing, the time for development may be reduced to about four hours.

The term "rigid polyvinyl chloride" as used in accordance with this invention means any polyvinyl chloride which contains none, or not more than about 5% plasticizer. In fact, it is our discovery that polyvinyl chloride which does contain more than about 5% plasticizer is not suitable for use as an indicator because the presence of a plasticizer creates preferential affinity for electron beam energy, thus preventing the formation of color and leaving no energy available to produce a color change in the polyvinyl chloride.

Thus the sole limitation upon the nature of polyvinyl chloride suitable for use in accordance with our invention is that described hereinabove. Therefore, one may employ not only polyvinyl chloride per se, but also any one of a wide variety of polyvinyl chloride copolymers, such as for example, those formed with polyvinylacetate, polyvinylidene chloride and other copolymers containing at least 70% polyvinyl chloride. These too, understandably, must contain not more than 5% plasticizer, preferably none.

As noted above, rigid polyvinyl chloride may be used as a visual indicator to determine whether or not a given unit of material which passed under an electron beam had, in fact, been subjected to irradiation. This may be accomplished merely by attaching a small sheet of polyvinyl chloride to the unit to be exposed to energy or, more conveniently, by inserting such sheet in the packaged unit. Within a period of 24 to 48 hours after irradiation the polyvinyl chloride sheet will have acquired a distinct color change, varying from a light visible yellow to a dark brown, depending upon the intensity of exposure. In this manner, one may check each unit which had passed under the electron beam and readily notice any defects in the mechanics of the irradiation operation. In other words, the color change taking place in the polyvinyl chloride within 24 to 48 hours (accelerated by increasing the temperature after irradiation to 120° F.) may be used by non-skilled operators as a constant safeguard to ensure irradiation of each unit.

In addition to its practical application as an indicator, we have also found that polyvinyl chloride is an accurate and reliable material for use in dosimetry and it is intended that the use of this substance in dosimetric methods be included within the scope of this application. In accordance with one embodiment illustrating this novel feature of our invention, rigid polyvinyl chloride sheets, 0.010 inch in thickness, were cut into 3 inch by 1 inch slides and irradiated in a Van de Graaff electrostatic accelerator (in duplicate) at each of the following doses: 1 mega, 2 mega, 3 mega, 4 mega, 5 mega, and 6 mega REP's (all at 2.1 million electron volts). The slides were laid directly on the conveyor belt for irradiation. On five days, the first day being the day of irradiation, and subsequently on the 6th, 10th and 13th day following irradiation, absorbance readings of the slides were taken on a Beckman model B spectrophotometer at an arbitrary wave length of 400 millimicrons. A non-irradiated slide was used as a control (blank). The results are tabulated in Table I.

TABLE I

| Dose, Mega REP's | Absorbance after irradiation | | | | | | | |
|---|---|---|---|---|---|---|---|---|
| | 0 day | 1 day | 2 days | 3 days | 6 days | 9 days | 10 days | 13 days |
| 1 | 0.046 | 0.085 | 0.045 | 0.032 | 0.032 | 0.045 | 0.051 | 0.053 |
| | 0.046 | 0.051 | 0.041 | 0.032 | 0.036 | 0.045 | 0.051 | 0.048 |
| 2 | 0.080 | 0.116 | 0.122 | 0.108 | 0.142 | 0.188 | 0.183 | 0.170 |
| | 0.085 | 0.130 | 0.136 | 0.136 | 0.188 | 0.220 | 0.228 | 0.232 |
| 3 | 0.120 | 0.408 | 0.442 | 0.480 | 0.535 | 0.600 | 0.610 | 0.620 |
| | 0.125 | 0.300 | 0.430 | 0.480 | 0.535 | 0.600 | 0.620 | 0.638 |
| 4 | 0.188 | 0.466 | 0.638 | 0.697 | 0.755 | 0.820 | 0.840 | 0.860 |
| | 0.258 | 0.680 | 0.745 | 0.795 | 0.850 | 0.910 | 0.935 | 0.950 |
| 5 | 0.267 | 0.600 | 0.795 | 0.860 | 0.910 | 1.000 | 1.022 | 1.071 |
| | 0.275 | 0.580 | 0.745 | 0.820 | 0.880 | 0.950 | 0.950 | 0.950 |
| 6 | 0.397 | 0.780 | 1.000 | 1.046 | 1.125 | 1.222 | 1.222 | 1.301 |
| | 0.408 | 0.780 | 1.000 | 1.097 | 1.125 | 1.222 | 1.260 | 1.301 |

It will be noted from the above that the absorbance (spectrophotometrically determined) is directly proportioned to the dose imparted. Moreover, the amount of absorbance is easily reproducible within normal limits of error. This phenomenon of progressive change in absorbance is of practical application in determining the amount of irradiation which a given unit of material has received. Thus, the results tabulated in Table II below and showing absorbance values on polyvinyl chloride slides irradiated at known doses in equal increments of 0 to 4 mega REP's may be translated to a standard curve by plotting the dose in mega REP's (abscissa) against the absorbance (ordinate).

TABLE II

| Dose, Mega REP's | Absorbance at 400 mµ |
|---|---|
| 1 | 0.060 |
| | 0.068 |
| | 0.063 |
| 2 | 0.220 |
| | 0.218 |
| | 0.235 |
| 3 | 0.820 |
| | 0.832 |
| | 0.775 |
| 4 | 1.400 |
| | 1.498 |
| | 1.438 |

Thereafter, any subsequent reading of an unknown dose imparted to a rigid polyvinyl chloride slide of identical thickness is taken spectrophotometrically. By using the standard curve, the absorbance reading can be directly converted to the dose in mega REP's. As an illustration, and referring to Figure 5 in the drawing, a standard curve is plotted from the data given in Table II. Subsequently, a series of slides are passed under the electron beam, these slides having been previously placed upon a hermetically sealed package. Approximately four hours after irradiation (development of color having been accelerated at 120° F.), the absorbance of the slides is read on the spectrophotometer, this figure being, as an example, 0.800. As shown in the drawing, 0.800 absorbance on the standard curve is equal to 3 mega REP's, the irradiation dose received by the package.

In order to demonstrate the effects of increased temperature on the rate of development and intensity of color of irradiated rigid polyvinyl chloride slides, a series of 3 inch by 1 inch by 0.010 inch slides were irradiated at 1 to 6 mega REP's (in one mega REP increments) at 2.1 million electron volts. The absorbance was measured after one and eighteen hours storage at room temperature. The slides were then stored at 120° F. and absorbance was read after 2, 4, 5⅓ and 6⅓ hours' storage. The results are shown are shown in Table III.

TABLE III

| Dose, Mega REP's | Time after irradiation | | | | | |
|---|---|---|---|---|---|---|
| | Room temperature | | 120° F. | | | |
| | 1 hour | 18 hours | 2 hours | 4 hours | 5⅓ hours | 6⅓ hours |
| 1 | 0.032 | 0.041 | 0.066 | 0.076 | 0.046 | 0.043 |
| 2 | 0.058 | 0.093 | 0.155 | 0.162 | 0.149 | 0.143 |
| 3 | 0.102 | 0.237 | 0.430 | 0.462 | 0.482 | 0.482 |
| 4 | 0.180 | 0.495 | 0.745 | 0.796 | 0.796 | 0.824 |
| 5 | 0.310 | 0.678 | 0.921 | 0.979 | 1.000 | 1.000 |
| 6 | 0.387 | 0.810 | 1.071 | 1.155 | 1.155 | 1.187 |

In actual practice, units which are intended for sterilization by irradiation are passed under the electron beam by means of a conveyor system of belt links. When such links are made of steel, copper or similar metal having a high atomic number, back-scattering of the electron beam rays and X-ray production will occur resulting in interference with the original dose received by the unit being irradiated. Such back-scattering also causes the formation of dark stripes on the polyvinyl chloride slides and, therefore, higher irradiation doses within the stripes. In order to eliminate errors caused by back-scattering, it is advantageous to place between the metal causing the back-scattering and the polyvinyl indicator a material, conveniently in the form of a sheet, such as carbon, paper, cellulose, aluminum, plastic or wood. These materials reduce the back-scattering to a minimum and remove any errors which may result from imparting disproportionate amounts of irradiation energy to the polyvinyl indicator. It is to be understood, however, that the use of these materials is not essential where the unit to be sterilized is placed on a non-back-scattering support, as for example, a metal having a low atomic number, such as aluminum, or plastic of sufficient thickness, i.e. ⅛ inch thickness for each million electron volts.

Figure 3:
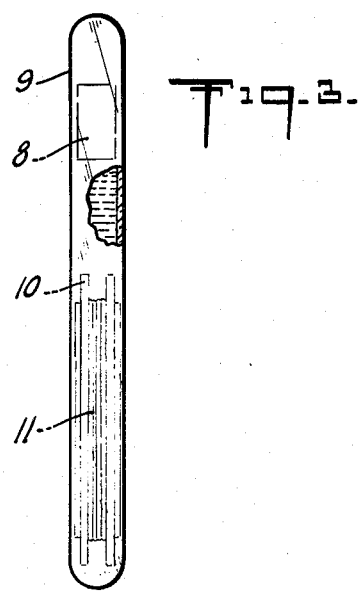
Fig. 3 represents a plan view of a hermetically sealed glass container and showing an indicator strip therein.
Figure 2:
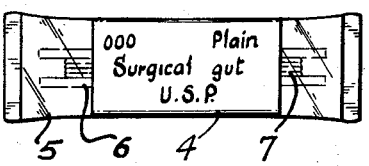
Fig. 2 represents a plan view of a hermetically sealed plastic container and showing a label adhesively attached thereto.
Figure 4:
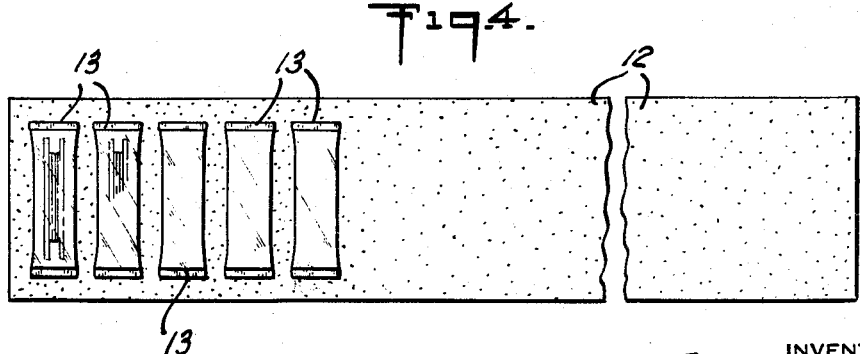
Fig. 4 represents a plan view of a plurality of plastic packages adhesively attached to an indicator strip.

It will now be readily apparent to those skilled in the art that rigid polyvinyl chloride finds wide application as an indicator and as a dosimeter. Referring to Figure 1 in the drawing, for purposes of illustration, one may advantageously employ rigid polyvinyl chloride as a reel 1, in a suture tube 2, made of suitable material such as glass, the suture material 3 being conveniently wound around reel 1. Alternatively, as illustrated in Figure 2, one may employ rigid polyvinyl chloride (per se or laminated to paper) in the form of a label 4 on a packaged unit 5 made of transparent plastic film such as polyvinyl chloride itself, or any other suitable plastic packing film, containing a reel 6, around which is wound a suture 7. Further, as shown in Figure 3, where the size of the packaged unit to be sterilized permits it, an indicator strip 8 of rigid polyvinyl chloride may be suitably inserted in a container 9 together with reel 10 around which is wound a suture 11. Additionally, as shown in Figure 4, rigid polyvinyl chloride may be used in the form of a strip 12 to which are attached, by adhesive means, a plurality of packaged units 13. Numerous other modifications of these uses will occur to those skilled in the art and it is intended that these obvious modifications be included within the scope of the invention. Naturally, the use of rigid polyvinyl chloride as a dosimeter is not intended to be limited to packages of any particular size, configuration, construction or contents. In fact, the rigid polyvinyl chloride may be used on or in any packaged or unpackaged unit being subjected to sterilization by irradiation, or, as noted above, it may be used as the packaging material itself.

In employing rigid polyvinyl chloride as a dosimeter, consideration must be taken of the capabilities of the instrument which is used as a source of energy. In other words, the penetrating ability may differ from one instrument to another. Therefore it is essential, before sterilization is attempted, to determine just how deep the rays of a given instrument can penetrate, and to check the rated electron voltage of the apparatus, taking into consideration the density of the material involved.

One modification of the method of this invention is the use of rigid polyvinyl chloride in measuring the penetration of ionizing radiation, and it is intended that this particular modification be included within the scope of this invention. In accordance with this modification, which is based on the proportionality of the irradiation dose to the ionization produced by the beam, a stack of rigid polyvinyl chloride slides of sufficient total thickness to asborb all the ionizing radiation is prepared, taking as an approximate standard the requirement of one inch of thickness for every six million electron volts transmitted, or about 0.16 inch for each m.e.v. expected. This assembly of slides is numerically marked in consecutive order, the slide nearest the beam being number 1, the slide next down being number 2, and so on. The assembly is then subjected to irradiation at the maximum dose required for sterilization, that is to say, in the order of about three million REP's. The color is then developed, either naturally by storage at room temperature or by acceleration at a temperature of about 120° F., and the intensity of the developed color in each slide is measured. This may be done at any arbitrary wave length from about 400 millimicrons to about 650 millimicrons. The absorbance (dose) is then plotted against thickness.

Figure 6 in the attached drawing is illustrative of the type of curve obtained in accordance with this method. The data necessary for the preparation of this curve was obtained as follows: A stack of one hundred rigid polyvinyl chloride slides, 0.010 inch each in thickness was prepared. The slides were numbered consecutively 1 to 100, No. 1 being at the top, No. 100 on the bottom. The stack, which was held together, with cellophane tape, was irradiated at approximately 3 mega REP's. The absorbance values were measured for each slide at 400 millimicrons wave length. A non-irradiated slide was used as control. All values were plotted in sequence on graph paper. The results, Figure 6, show the ionization curve and the depth of penetration in inches of a beam originating from a linear accelerator, and establish the penetrating limits for the effectiveness of that particular sterilizing apparatus. A straight, horizontal dotted line is drawn from point A which represents the minimum sterilizing (entrance) dose and is the first slide on curve D, to that point, B, where it crosses curve D and which represents the maximum depth which receives a sterilizing dose equivalent to A. From this point a perpendicular dotted line BC is drawn to the abscissa to obtain the number of the slide representing the exit dose. Curves for any other source of electron energy, i.e. Van de Graaff, betatron, artificial or natural radioactive isotopes may be similarly established. In actual practice the type of curve illustrated in Fig. 6 serves as a useful guide for determining penetrating limits of a given apparatus. For example, in the illustrated curve the apparatus under test was capable of emitting rays of sterilizing capacity up to a thickness of 51 slides. By using the formula:

Number of slides × thickness of each slide in inches × density of polyvinyl chloride one obtains the penetration of the radiation in unit density, thus:

$$51 \times 0.010'' \times 1.38 = 0.705''$$

The above formula also establishes the electron volt rating of the apparatus by the following calculation:

million electron volts $$= \frac{\text{penetration in inches for unit density}}{.130}$$

.130 = number of inches in unit density material penetrated by one million electron volts.
Therefore $$\frac{.705}{.130} = 5.423 \text{ million electron volts}$$

It will be seen, therefore, that rigid polyvinyl chloride, when used in the manner described hereinabove, is a useful and accurate tool for establishing the penetrating ability of a source of electron energy as well as a criterion for the amount of dose obtained at any given thickness. There are, of course, some limitations as to the thickness of slides which may be advantageously used in the dosimetric method described herein, these being from about 2 to about 20 mils. If a thickness below 2 mils is used, the color imparted to the slide is too pale and the shades cannot be differentiated. If a thickness in excess of 20 mils is used, the resulting color is too dark.

Yet another and equally useful application of rigid polyvinyl chloride in the field of dosimetry, and which is intended to be included within the scope of this application, is its utility as a means for establishing the size, shape of beam and distribution of energy therefrom where the source of energy is an electrostatic generator.

It is a known fact that high energy radiation generators emit a phenomenon commonly referred to as a "spot beam." Through exertion of electromagnetic force on this spot beam, it is possible to expand it into a "line beam" by moving the electron beam many times each second along a straight line. By this procedure, which is known as "scanning," one can irradiate units of larger dimensions than those irradiatable at a point source. However, where such increase in size is involved, it is important to determine the width of scanning because the width determines, along with other factors, the capacity of the generator with respect to the size of the unit. Furthermore, it is important to ascertain the uniformity of dose within the scan width in order to ensure emission of a uniform sterilizing dose.

In accordance with this particular modification of our novel process, a sheet of rigid polyvinyl chloride, suitable in size greater (width) than expected for acceptance of emitted rays, is placed on a stationary conveyor belt under the high energy radiation source for several seconds, the color is allowed to develop and the scan width is measured in inches. If it is desired to determine simultaneously the scan width and the linear uniformity of dose, the rigid polyvinyl chloride sheet is passed under the high energy source on a moving conveyor belt, the color is developed and the scan width is measured (width of the colored band). Then the sheet of polyvinyl chloride is cut into strips of suitable width, one inch for convenience, perpendicular to the scan width. The position of each strip with respect to the overall width of the colored band is noted, and the absorbance readings of the individual strips are taken. By converting these readings to dose (standard curve, Fig. 5) one can easily ascertain the linear uniformity or non-uniformity of dose. That is to say, one can determine whether a larger unit passing under the high energy source has received the predetermined dose of radiation energy which was intended for it.

It has been found that the most successful application for the methods described herein is in the field of sterilization of plastic-packaged materials. In this connection, rigid polyvinyl chloride may be employed either as an indicator or as a dosimeter, on or in packaged units made of a wide variety of synthetic materials, for example cellophane, ethyl cellulose, cellulose acetate, rubber hydrochloride, polyethylene, nylon film, polyester film, polyvinyl film, polytrifluoromonochlorethylene and polytetrafluorethylene. Numerous other types of well-known packaging materials may also be advantageously employed in the novel process, as for example, paper, cardboard, glass and metal foils and their laminates, for example those of aluminum, tin, copper, gold or silver.

As sources of high energy radiation in the process of this invention there may be mentioned the electron accelerators such as the linear, the Van de Graaff and the betatron. Radioactive isotopes such as $Co^{60}$ may also be employed.

What is claimed is:

1. In a package adapted to be passed through a field of high energy radiation and containing material to be sterilized by said radiation, an indicator comprising a member selected from the group consisting of rigid, radiation sensitive polyvinyl chloride and copolymers thereof containing at least 70 percent polyvinyl chloride, said indicator containing less than about 5 percent plasticizer, which upon exposure to high energy irradiation in amounts of at least 1 mega REP is converted to a distinct color.

2. In a method of sterilizing by means of high energy radiation, the steps which comprise subjecting material to be sterilized and an indicator associated therewith to high radiation, said indicator comprising a member selected from the group consisting of rigid, radiation sensitive polyvinyl chloride and copolymers thereof containing at least 70 percent polyvinyl chloride, said indicator containing less than about 5 percent plasticizer, which upon exposure to high energy radiation in amounts of at least 1 mega REP is converted to a distinct color, and determining from said color the extent of radiation.

3. In a method of sterilizing by means of high energy radiation the steps of determining the amount of irradiation which a given unit of material has received which comprises irradiating a series of dosimeter slides selected from the group consisting of rigid, radiation sensitive polyvinyl chloride and copolymers thereof containing at least 70 percent polyvinyl chloride, said slides containing less than about 5 percent plasticizer, at known doses in equal increments of mega REP's, translating the resulting absorbance values to a standard curve by plotting said absorbance values against the dose expressed in mega REP's and employing said curve as a standard for determining dose from absorbance.

4. In a method of sterilizing by means of high energy irradiation, the steps of determining the penetrating ability of a given source of radiation energy, which comprise exposing a stack of dosimeter slides selected from the group consisting of rigid, radiation sensitive polyvinyl chloride and copolymers thereof containing at least 70 percent polyvinyl chloride, said slides containing not more than about 5 percent plasticizer and being of sufficient total thickness to absorb all of the emitted ionizing irradiation, and plotting the resulting absorbance values for each slide against respective position in said stack.

5. In a method of sterilizing by means of high energy radiation the steps of measuring distribution of the quantity of radiation emitted by a source of high energy in terms of depth, which comprise exposing a stack of dosimeter slides selected from the group consisting of rigid, radiation sensitive polyvinyl chloride and copolymers thereof containing at least 70 percent polyvinyl chloride, said slides containing not more than about 5 percent plasticizer, and being of sufficient thickness to absorb all of the ionizing radiation, and converting the resulting absorbance values to radiation dose in mega REP's by means of a standard curve.

6. In a method of sterilizing by means of high energy radiation, the steps of measuring scan width of a high energy radiation beam which comprise exposing a film selected from the group consisting of rigid polyvinyl chloride and copolymers thereof containing at least 70 percent polyvinyl chloride, said film containing less than about 5 percent plasticizer, to a source of high energy radiation and measuring the width of the resulting color band.

7. In a method of sterilizing by means of high energy radiation the steps of determining the linear uniformity of dose of a high energy radiation beam which comprise exposing a film selected from the group consisting of rigid polyvinyl chloride and copolymers thereof containing at least 70 percent polyvinyl chloride, said film containing less than 5 percent plasticizer, cutting said film perpendicular to the scan width into strips of suitable size and measuring the absorbance values of said strips.

8. In a package adapted to be passed through a field of high energy radiation and containing material to be sterilized by said radiation, an indicator label comprising a member selected from the group consisting of rigid, radiation sensitive polyvinyl chloride and copolymers thereof containing at least 70 percent polyvinyl chloride, said indicator label containing less than about 5 percent plasticizer, which upon exposure to high energy irradiation in amounts of at least 1 mega REP is converted to a distinct color.

9. In a package adapted to be passed through a field of high energy radiation and containing material to be sterilized by said radiation, an indicator strip with adhesive means comprising a member selected from the group consisting of rigid, radiation sensitive polyvinyl chloride and copolymers thereof containing at least 70 percent polyvinyl chloride, said indicator strip with adhesive means containing less than about 5 percent plasticizer, which upon exposure to high energy irradiation in amounts of at least 1 mega REP is converted to a distinct color.

10. In a method of sterilizing by means of high energy radiation, the steps which comprise subjecting material to be sterilized and an indicator label associated therewith to high energy radiation, said indicator label comprising a member selected from the group consisting of rigid, radiation sensitive polyvinyl chloride and copolymers thereof containing at least 70 percent polyvinyl chloride, said indicator label containing less than about 5 percent plasticizer, which upon exposure to high energy radiation in amounts of at least 1 mega REP is converted to a distinct color, and determining from said color the extent of radiation.

11. In a method of sterilizing by means of high energy radiation, the steps which comprise subjecting material to be sterilized and an indicator strip with adhesive means associated therewith to high energy radiation, said indicator strip with adhesive means comprising a member selected from the group consisting of rigid, radiation sensitive polyvinyl chloride and copolymers thereof containing at least 70 percent polyvinyl chloride, said indicator strip with adhesive means containing less than about 5 percent plasticizer, which upon exposure to high energy radiation in amounts of at least 1 mega REP is converted to a distinct color, and determining from said color the extent of radiation.

References Cited in the file of this patent

UNITED STATES PATENTS

| | | |
|---|---|---|
| 2,738,429 | Goldblith | Mar. 13, 1956 |
| 2,757,291 | Schulman | July 31, 1956 |
| 2,789,232 | Block | Apr. 16, 1957 |
| 2,830,969 | Zoubek | Apr. 15, 1958 |